March 13, 1928.  1,662,318
M. G. McCORKEL ET AL
FARM GATE
Filed Oct. 25, 1926  2 Sheets-Sheet 1
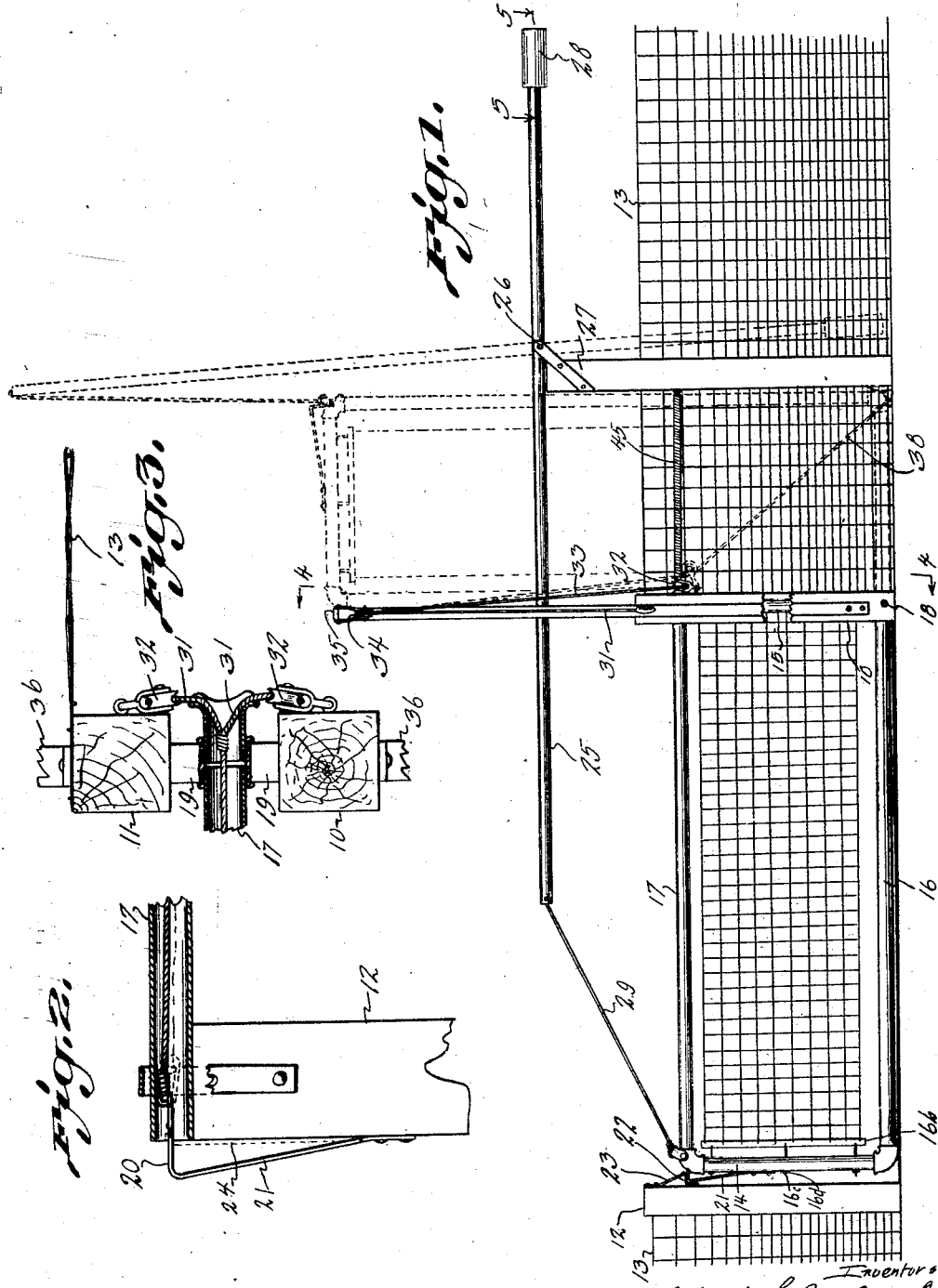

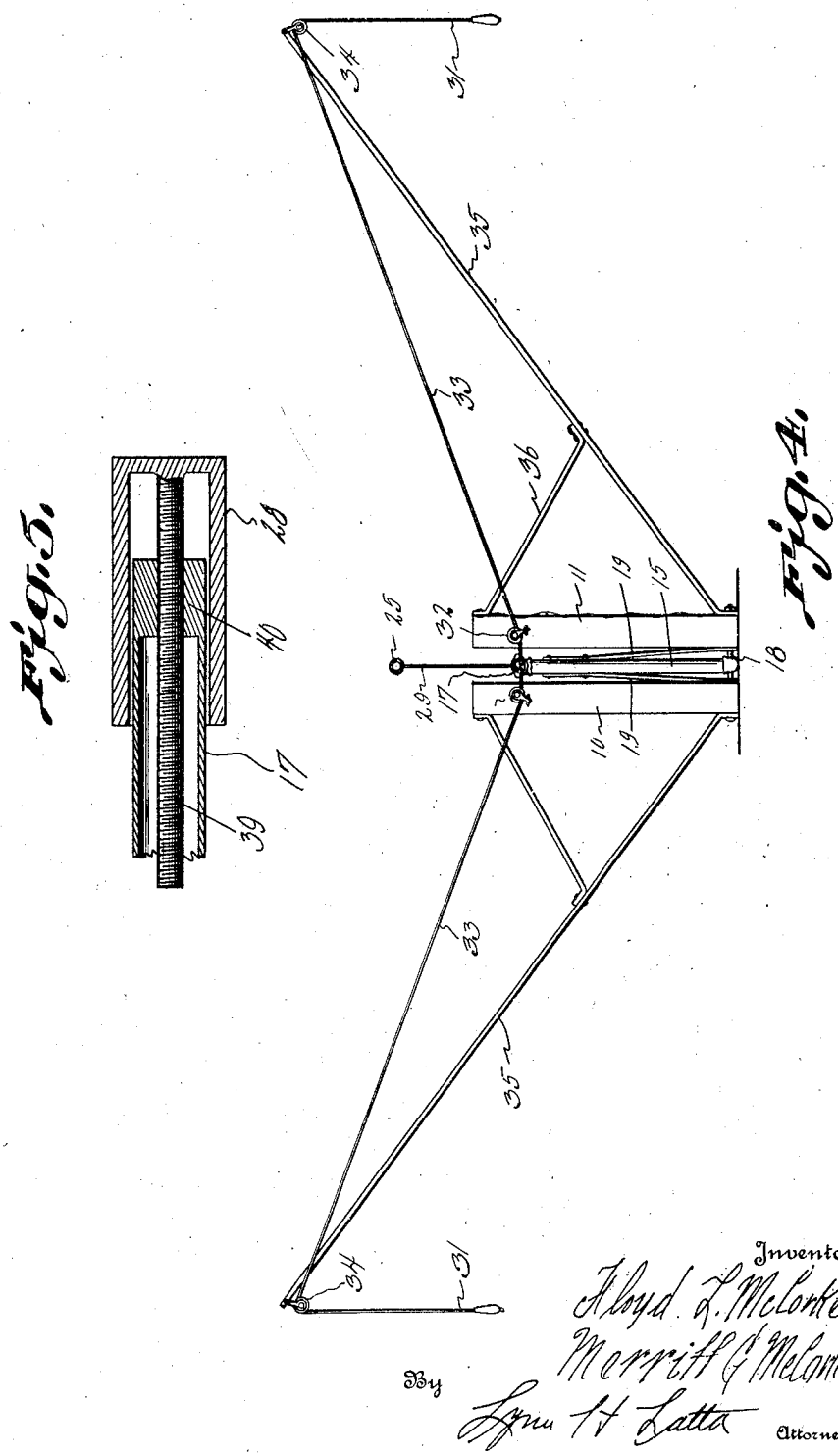

Patented Mar. 13, 1928.                                                                          1,662,318

UNITED STATES PATENT OFFICE.

MERRITT G. McCORKEL AND FLOYD L. McCORKEL, OF WASHTA, IOWA.

FARM GATE.

Application filed October 25, 1926. Serial No. 143,939.

Our invention relates to a farm gate, especially adapted for farm use and it is my object to provide a gate of simple, durable, and inexpensive construction which may be operated from a distance.

More particularly, it is our object to provide such a gate which may be operated from either side by one of two operating cables, either one of which, when pulled, will swing the gate to closed position if it is standing open or will swing it to open position if it is standing closed.

Another object of the invention is to provide a gate of the type adapted to swing into the air on a horizontal axis and which may be so controlled by a single operating cable at either side of the gate.

Another object of the invention is to provide a gate having an operating cable extending longitudinally, thereof, the cable being so protected that stock can not accidentally unlatch the gate.

A still further object of the invention is to provide a gate which is so balanced that very little force is required to operate it, and which is substantially balanced at all positions within its range of swing.

With these and other objects in view, our invention consists in the construction, arrangement, and combination of the various parts of our device, whereby the objects contemplated are attained, as hereinafter more fully set forth, pointed out in our claims, and illustrated in the accompanying drawings, in which:

Fig. 1 is an elevation of the gate, its open position being shown in dotted lines.

Fig. 2 is a detail, sectional view through the upper portion free end of the gate proper, illustrating the latch.

Fig. 3 is a plan view of the posts between which the gate proper is pivoted, the upper rail of the gate being shown in section.

Fig. 4 is a sectional view taken as indicated by the line 4—4 of Fig. 1.

Fig. 5 is a detail, sectional view taken on the line 5—5 of Fig. 1.

We have used the reference characters 10 and 11 to indicate a pair of posts between which the gate proper is pivoted and the numeral 12 to indicate a post defining the other limit of a gateway, formed in a fence 13, secured to the posts 12 and 11 respectively. The gate proper includes the end members 14 and 15 connected in any suitable manner such as by the rails 16 and 17, and covered with wire netting or the like 16$^a$. The upper rail of the gate is formed of a length of metal tubing or the like 17, which may be square or round, and which serves as a protective casing for that portion of the operating cable which spans the gateway.

The netting 16$^a$ is secured to one end of the gate and at the other end of the gate it is secured to a bar 16$^b$ which in turn is adjustably secured to the end member 14 by eye bolts 16$^c$, extending through the member 14 and provided with nuts 16$^d$, which may be tightened to draw the bars 16$^b$ toward the member 14.

The gate proper is hinged at 18 between the posts 10 and 11 and a pair of braces 19, secured at their upper ends to the gate, extend downwardly into engagement with the faces of the posts 10 and 11 where they also receive the bolt 18. It will be seen that the braces 19 serve to position the gate centrally between the posts 10 and 11 and to insure its smooth operation in a single plane.

At its free end, the gate is provided with a latch comprising a strip of spring metal 20, secured to the end member 14 of the gate, extending upwardly, as at 21, and away from the gate in its normal position and bent inwardly at its upper end whence it is received in the tubular rail 17.

A keeper having the horizontal portion 22 to receive the latch 20, and having the inclined portion 23, is secured to the post 12.

It will now be seen that as the gate is swung from its open position to its closed position, the inclined portions of the keeper and latch will engage each other to force the latch into a retracted position as shown in dotted lines at 24 in Fig. 2.

It may be mentioned at this point that the purpose is to so balance the gate, by means of a counter-weight, that it will normally tend to swing upwardly so that when the latch is simply released, the gate will open automatically. The counter-balancing mechanism is so arranged that the moment of force produced by the excess weight of counter-balance over that of the gate, will gradually decrease as the gate is swung upwardly, and will become zero before the gate has reached a position where it balances itself upon a pivot.

It will be noted that when the gate is in its raised position, its weight lies entirely behind the pivot 18, whereas in its closed position, it lies entirely forward of the pivot.

There is, accordingly, a position between these two positions in which the gate will be balanced upon its pivot. It is desirable that the force exerted against the gate in lifting it, be greatest at the beginning of the upward swing and that the momentum of the gate as it swings upwardly be merely sufficient to carry it past the position just mentioned in which its weight would be balanced. After passing this intermediate position, the gate will swing to its upright position, under the urge of its own weight.

In order to counter-balance the weight, we have experimented with attaching the weight directly to the gate, but find that in order to do so, the arm which carries the counter-weight, must extend upwardly, and that consequently the greatest leverage of the counter-weight will not be obtained until the gate has reached a considerably elevated position.

In order, therefore, to obtain the greatest leverage at the beginning of the swing, we provide a counter-balancing mechanism including a balance lever 25 pivoted at 26 upon a post 27 and thereby divided into an arm extending over the gate proper in the plane of the gate and an arm extending from the other direction, and provided with a counter-weight 28. The arm which extends over the gate is connected thereto by a cable 29.

It will now be seen that, the weight 28 being of such size, and at the proper distance from the pivot 26 as to give an excess of leverage over the combined weights of the gate and the arm above it, that the arm 25 will be maintained constantly in a fixed position as shown in Fig. 1 with the cable 29 taut, while the gate 17 is closed. The lever 25 is positioned horizontally and parallel to the gate proper. Consequently, the greatest leverage will be exerted at the beginning of the swing when the gate is released. The cable 29 is of such length that the lever 25 will approach a vertical position faster than the gate proper. When the gate has neared the intermediate balanced position, the cable 29 will no longer exert a pull against the gate, the lever having attained its vertical position and the cable having become slack.

We provide a spring 45 which is secured to the gate at its upper corner and to the post 27 at such a height that after gate has passed its intermediate balanced position and begins to swing rearwardly under the urge of its own weight, it will become taut and increasingly oppose the swing of the gate toward the post 27. Thus the gate will move to its vertical position slowly and will not be suddenly stopped with a jar, as would be the case if it were allowed to strike the post 27.

It will be seen that in moving the gate back toward its closed position, the counter-weight will not have to be lifted in addition to the gate, and will not oppose the downward swing of the gate until after the gate has again passed the intermediate balanced position and will then retard the downward swing of the gate increasingly, as the gate nears its closed position and tends to gain momentum under the urge of its own weight. By so arranging the counter-weight and the gate in their relation to each other, we find it possible to use a single operating cable for swinging the gate in either direction. The operating cable 30 is attached to the end of the horizontal portion 21 of the latch, extends through the tubular rail 17, and is divided at the other end of the rail into two pull cables 31, which extend around pulleys 32 on the posts 10 and 11, respectively and thence upwardly as at 33 to pulleys 34, suspending from a pair of brackets 35 extending upwardly and outwardly from the posts 10 and 11 in a plane perpendicular to the plane of the fence. The brackets 35 are supported by braces 36.

This is an important advantage in that were the cable exposed, the latch might be released by the accidental engagement of the cable by an animal rubbing against the gate.

It will now be seen that when the gate is in closed position and either of the pull cables 31 is pulled upon, that the latch 20 will be released to allow the gate to swing upwardly as hereinbefore described. As the gate approaches its raised position, the cables 31 will be drawn with it toward positions as indicated by the dotted lines at 38, extending rearwardly and downwardly from the pulleys 32 to the rear point of the gate. When it is desired to close the gate, either of the cables is again pulled and will serve this time to move the gate past its intermediate balanced position in a closing direction.

It will be understood that in closing the gate, the operating cable will be pulled with sufficient force to give the gate momentum to swing past the intermediate position, since after it has passed this position, the operating cable can no longer assist the gate in its downward swing against the retarding action of the counter-balance. Sufficient momentum must therefore be given the gate to cause its downward swing to the point where the latch will retain the gate in closed position. It will be understood that the balance of weight of the counter-weight is sufficiently small that it takes very little pull to transmit the requisite energy for swinging the gate to closed position.

This excess weight may be adjusted, the counterweight 28 being in the form of a hollow cylinder provided with a central stand 39, threaded into a lock 40 in the end of the lever 25. By rotating the weight, its longitudinal position is varied.

It will be noted that when the gate is in open position, it does not obstruct the space on either side of the fence as is done by the ordinary side swinging gate. Furthermore, the operating cables are carried by brackets which are extended upwardly so as to leave a clear space underneath each bracket on either side of the fence. Thus it is possible to plow to the usual distance of five or six feet from the fence without being hindered by the brackets 35, which at a distance of six feet away from the fence are approximately five feet in height.

Some changes may be made in the construction and arrangement of the parts of our invention without departing from the real spirit and purpose of our invention, and it is our intention to cover by our claims, any modified forms of structure or use of mechanical equivalents, which may be reasonably included within their scope.

We claim as our invention:

1. In a gate, a gateway, a gate proper pivoted at a lower corner in the gateway for swinging movement in a vertical plane, from a horizontal to a vertical position, the weight of the gate tending to urge it toward either of said positions from an intermediate balanced position, a keeper on the gateway, a co-acting latch on the gate proper adapted to engage the keeper automatically upon downward movement of the gate proper to closed position, the upper member of the gate proper being tubular and provided with a laterally curved guide element at its end opposite the latch, a cable secured to the latch extending through said upper member, thence around said guide element, thence laterally around a guide element secured to the gateway adjacent said upper member, thence upwardly and outwardly and over a guide element supported at a distance from the gateway in a lateral direction.

2. In a gate, a gateway, a gate proper pivoted at a lower corner in the gateway for swinging movement in a vertical plane, from a horizontal to a vertical position, the weight of the gate tending to urge it toward either of said positions from an intermediate balanced position, and means to overbalance the weight of the gate in all positions from said horizontal position to a point near said intermediate position, said means including a post, a lever fulcrumed upon said post, in the plane of the gate and having an arm extending over the gate, a cable connecting said arm with the gate, and a weight on the other end of the lever, the parts being so arranged that the cable will slack when said intermediate position is reached by the gate, said lever being tubular and provided with a threaded nut at one end and said weight being formed as a hollow sleeve provided with a central threaded shank, threaded through said nut whereby to telescope the sleeve relative to the end of the lever.

Signed Sept. 27, 1926, at Sioux City, in the county of Woodbury, and State of Iowa.

FLOYD L. McCORKEL.
MERRITT G. McCORKEL.